Feb. 9, 1971   C. SZYMANSKI ET AL   3,561,041
FISH HANDLING METHOD AND APPARATUS
Filed May 24, 1968   5 Sheets-Sheet 3

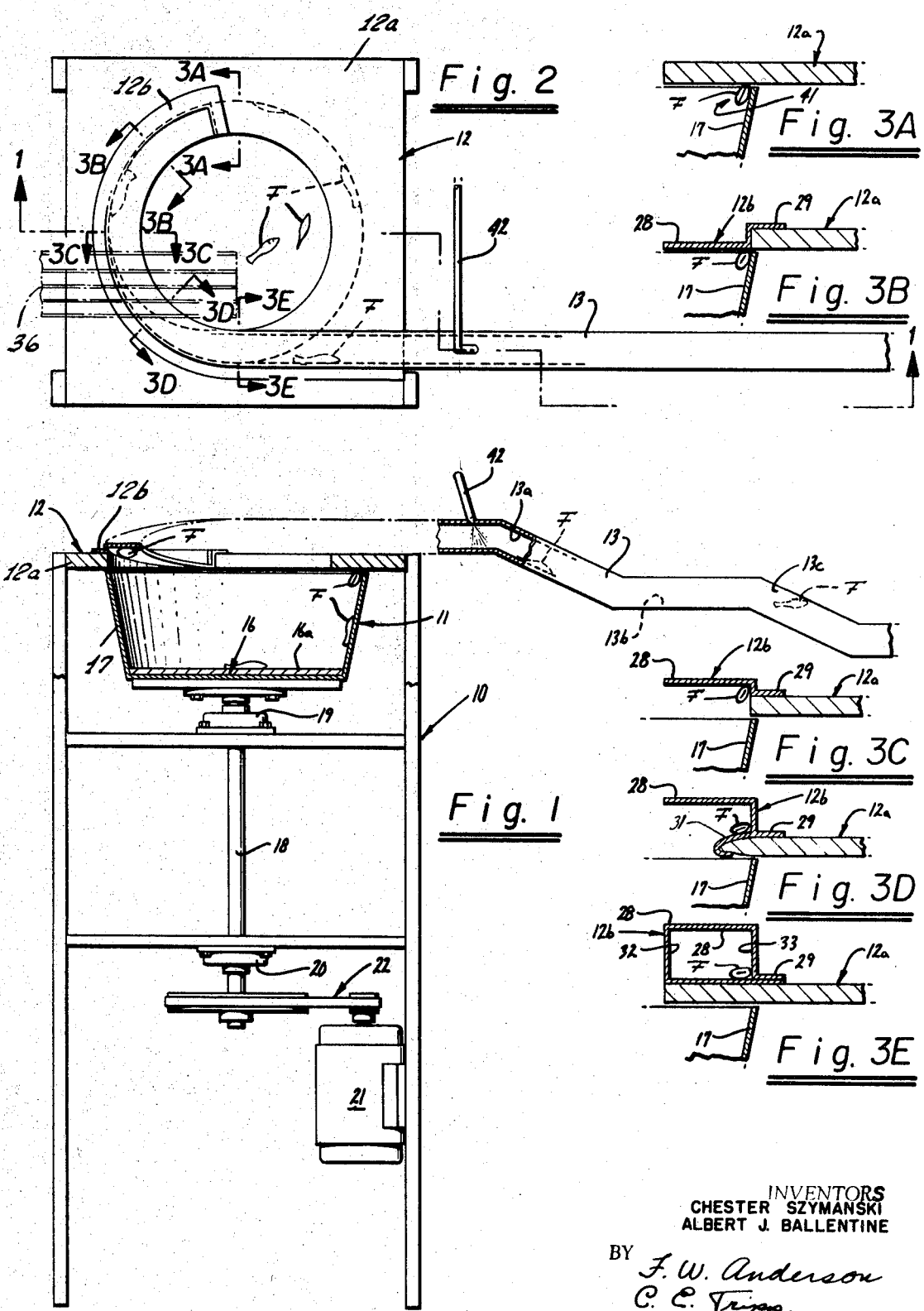

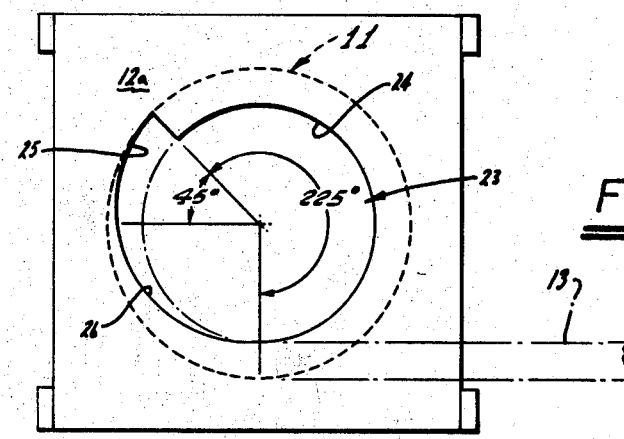
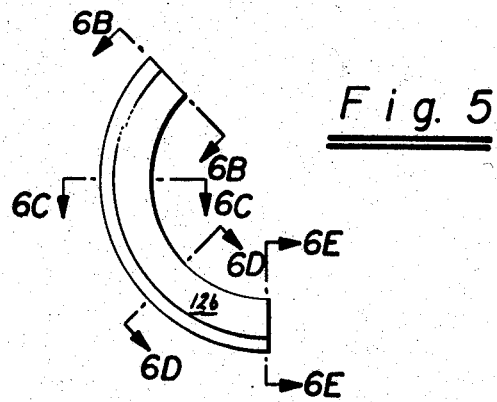
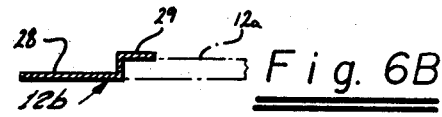
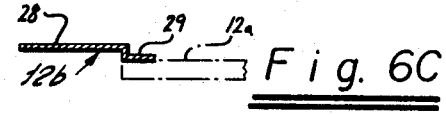
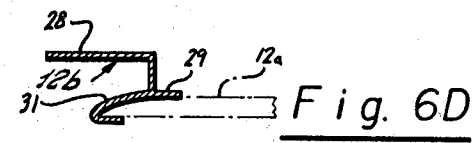
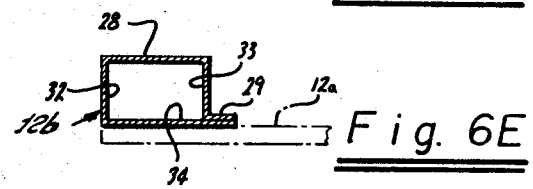

INVENTORS
CHESTER SZYMANSKI
ALBERT J. BALLENTINE
BY *F. W. Anderson*
*C. C. Tripp*
Attorneys

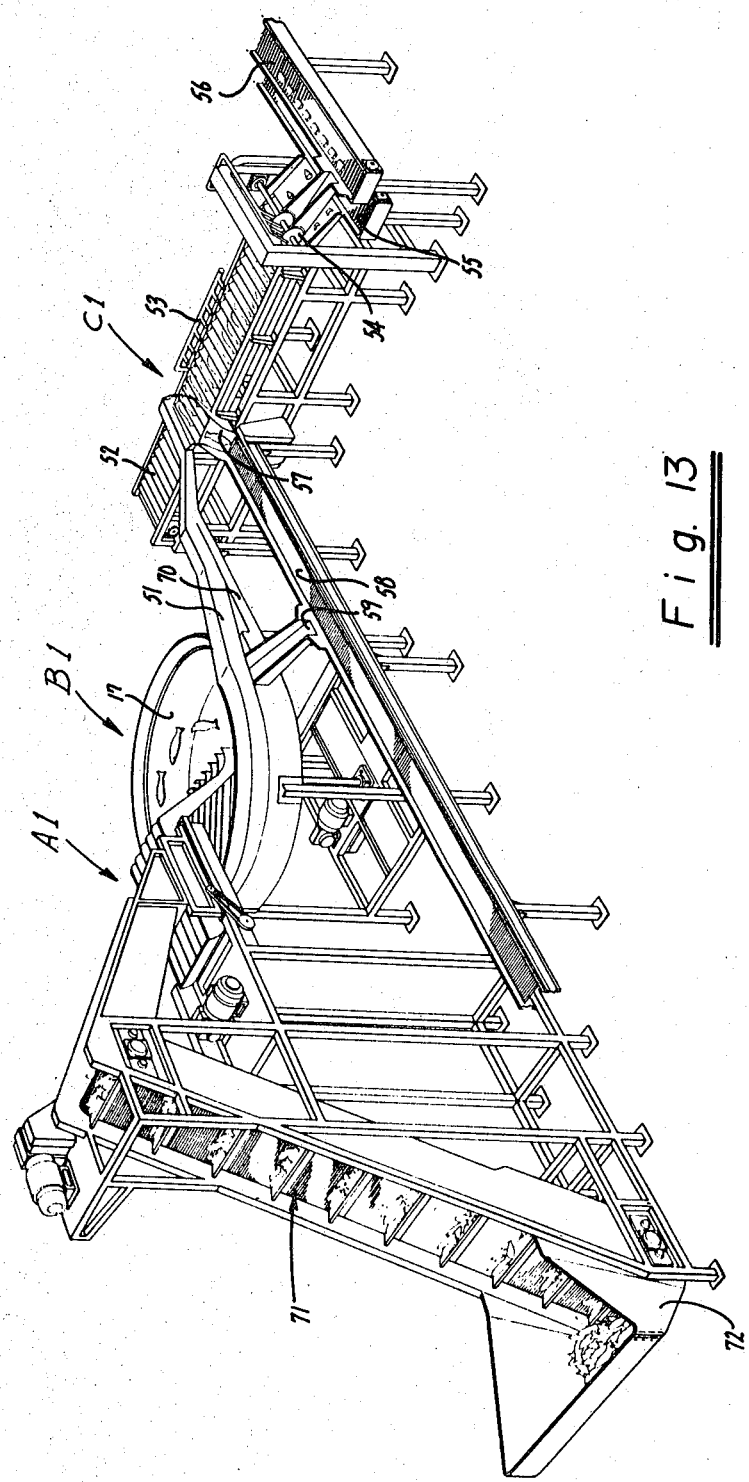

United States Patent Office 3,561,041
Patented Feb. 9, 1971

3,561,041
FISH HANDLING METHOD AND APPARATUS
Chester Szymanski and Albert J. Ballentine, San Jose, Calif., assignors to FMC Corporation, San Jose, Calif., a corporation of Delaware
Filed May 24, 1968, Ser. No. 731,996
Int. Cl. A22c 25/08
U.S. Cl. 17—45                    7 Claims

ABSTRACT OF THE DISCLOSURE

A fish handling method for feeding fish (e.g., anchovies, sardines, etc.) head first in single file and at a relatively high rate. The fish are deposited upon an upwardly faced rotating surface. By virtue of sliding frictional engagement between the fish and the rotating surface, the fish are accelerated in the direction of rotation and they are caused to move radially by centrifugal force toward the perimeter of the rotating surface. Fish are moved away from the periphery of the rotating surface and collected in a region from which they are discharged head first in single file. The apparatus includes a rotating tub-like device which is continuously rotated about an upright axis and into which the fish are fed. Means cooperates with the rotating device for removing and collecting the fish therefrom and for delivering the fish head first in single file.

BACKGROUND OF THE INVENTION

Various methods and machines have been developed for the handling and processing of fish in processing plants. For example, machines have been developed for cutting off the heads and/or tails of the fish. So-called header machines have been developed which arrange fish head first in several rows on a conveyer, thereby facilitating their transfer to another machine or operation. In many instances it has been found that machines cannot be operated economically because no apparatus is available for effectively feeding fish to the machine at a rate comparable to the machine's capacity. For the same reason it has not been feasible to automate several machines in a single production line. We have found that for the automated feeding of fish to a fish cutter or other proceesing machine at a high rate, it is desirable and probably necessary that the fish be fed head first and in single file. In sofar as we are aware, no equipment has been available which is capable of supplying fish in this fashion at a high rate commensurate with the capacity of fish cutters or other fish processing machines.

SUMMARY OF THE INVENTION AND OBJECTS

This invention relates generally to methods for the handling of fish, and to apparatus for carrying out such methods. More particularly the invention relates to fish handling methods and apparatus for delivering fish head first in single file to cutting or other processing operations.

It is an object of the invention to provide a method and apparatus of the above character which is capable of discharging the fish head first in single file at a relatively high rate.

Another object is to provide a method and machine of the above character which carries out both fish heading and the arranging of the fish in single file.

Another object is to provide a method and apparatus of the above character which is capable of supplying fish cutting and other processing machines at a rate such that the machine can operate at its maximum capacity.

Another object is to provide a method and apparatus of the above character which does not mutilate or cause physical injury to the fish.

Another object is to provide apparatus of the above character which is relatively simple and compact.

Additional objects and features of the invention will appear from the following description in which the prefered embodiments have been disclosed in detail in connection with the accompanying drawing.

In accordance with the present method fish are delivered upon an upwardly faced circular surface in a region spaced radially from its perimeter. The surface is rotated about a central and generally upright axis. The fish are caused to be accelerated in a direction corresponding generally to the direction of rotation, the acceleration being by virtue of sliding frictional contact with the circular surface. Also the fish are caused to slide toward the perimeter region of the circular surface. The fish are then moved with continued rotary motion into a collecting region from which they are discharged head first in single file. The apparatus consists of a tub-like device (hereinafter referred to as a tub) which includes a circular bottom wall forming an upwardly faced surface. The tub is mounted for rotation about a generally vertical axis. Feed means serves to deposit fish on the upper surface of the bottom wall whereby the fish have frictional contact with the upper surface. The fish deposited on the upper surface are accelerated in the direction of rotation and are moved radially to the perimeter region of the surface by centrifugal force. Means are provided for continuously removing fish from the perimeter of the circular surface and for discharging the same head first in single file and at a relatively high rate.

BRIEF DESCRIPTION OF THE DRAWING

FIG. 1 is a side elevational view partly in section illustrating apparatus incorporating the invention and which can be used for carrying out the method;

FIG. 2 is a plan view of the apparatus shown in FIG. 1;

FIGS. 3A, 3B, 3C, 3D, and 3E are cross-sectional details taken respectively along the section lines 3A, 3B, 3C, 3D and 3E of FIG. 2;

FIG. 4 is a plan view showing one part of the cover means for the tub;

FIG. 5 illustrates another part of the cover means for the tub;

FIGS. 6B, 6C, 6D and 6E are details in section taken along the section lines 6B, 6C, 6D and 6E of FIG. 5;

FIG. 13 is a perspective view like FIG. 9 but showing another arrangement of equipment.

DESCRIPTION OF THE PREFERRED EMBODIMENTS

Figure 8:
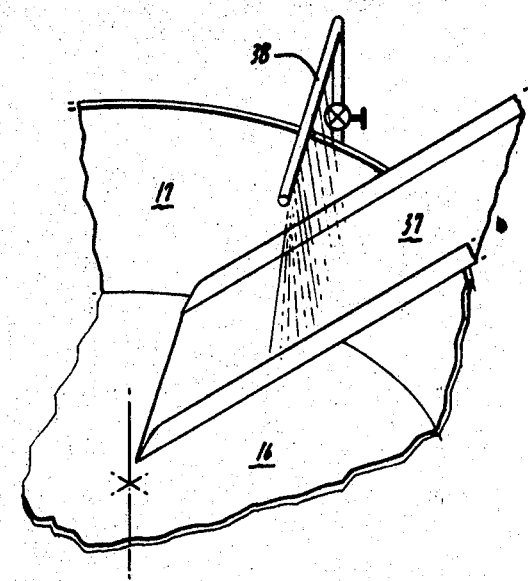
FIG. 8 is a perspective view like FIG. 7 but illustrating another arrangement for feeding fish to the tub.

The apparatus illustrate in FIG. 1 consists of a suitable frame 10 serving to rotatably support the tub or tube-like device 11. Cover means 12 overlies the tube 11 and makes connection with a discharge chute 13.

More particularly the tub 11 is shown comprising a circular bottom wall 16 and outwardly angled side walls 17. The bottom wall 16 may be an ordinary smooth metal surface or the smooth surface of a liner 16a. In general the device 11 can be made of any suitable material, such as suitable metal like a stainless steel.

The bottom wall 16 of the tube is shown secured to the upper end of the vertical shaft 18. This shaft is suitably journalled, as by means of the bearings 19 and 20, and it is connected to suitable drive means, such as the electric motor 21, and the sheave-belt assembly 22.

The cover means 12 in this particular instance consists of one part 12a which can be made as shown in FIG. 4. It is disposed horizontally with a central opening 23 overlying the tub 11. The position of the upper edge of the tub 11 is indicated by dotted lines in FIG. 4. The perimeter of the opening 23 consists of an arcuate edge 24 extending through about 225°. Also it consists of an arcuate edge 25 on a diameter greater than arcuate edge 24, and extending for about 45°. The perimeter is completed by the curved edge 26 which extends between portions 24 and 25 and between the two diameters just mentioned.

The additional part 12b of the cover means is shown in FIG. 5. In this instance it is generally arcuate in shape and extends over an angle of about 135°. It can be made of suitable sheet metal like stainless steel. FIGS. 6B–6E illustrate a suitable shaping and the positional relationship between this part and the part 12a. The main upper wall 28 at one end is offset downwardly (FIG. 6B) with respect to the attaching flange 29. In FIG. 6C the wall 28 is offset upwardly with respect to the flange 29, and in FIG. 6D the offsetting has been extended. Also there is a part 31 which is bent or otherwise formed to enclose the adjacent edge of part 12a. In FIG. 6E the wall 28 has been further offset upwardly from flange 29 and a complete discharge duct has been formed by wall 28 together with the side walls 32 and 33, and the lower wall 34.

When the part 12b as shown in FIG. 5 is installed upon the part shown in FIG. 4, the arrangement is substantially as shown in FIGS. 1 and 2. The part 12b is secured to the part 12a, and its one end makes connection with the discharge chute 13. The inner periphery of the arcuate part 12b continues the circular configuration of the edge 24 whereby, as viewed in plan, there is a circular opening through which fish F can be fed.

Part 12b in effect forms a guide path or track through which the fish F pass head first in single file as they leave the rotating tub. This guide path is arcuate and upwardly inclined from the lower side of the cover part 12a.

The construction described above is one particular cover means which has been built and successfully used. It should be understood that other constructions may be better suited for commercial apparatus.

Detail FIGS. 3A–3E show the relationship between the assembled parts 12a and 12b and the upper edge of the tub 11. The views 3B–3E correspond generally to views 6B–6E respectively. The upper edge of the side walls 17 is free from direct contact with any part of the cover means. FIG. 3A shows that for the angular distance not occupied by the cover part 12b, the upper edge of the side walls 17 underlie an inner margin of the part 12a. FIG. 3B shows how the upwardly sloped wall 28 of part 12b overlies the upper edge of the top side walls 17 where the inner periphery of part 12a is cut back as shown in FIG. 4. FIGS. 3C, 3D and 3E show the gradual development of the part 12b into a discharge duct or chute.

Figure 7:
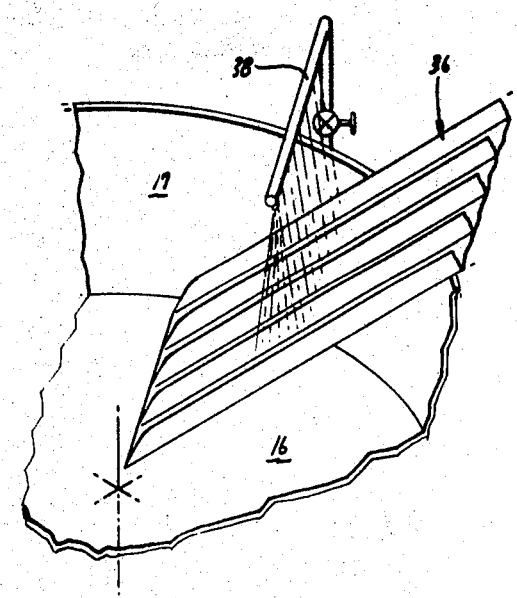
FIG. 7 is a detail in perspective schematically illustrating one arrangement for feeding fish to the tub.

The apparatus of FIGS. 1 and 2 can be operated by manually introducing fish into the tub 11 while it is rotating. However, it is desirable to provide mechanical means for this purpose, such as the chute 36 or other feed device. As shown in FIG. 7, the chute 36 is of the multiple trough type intended to supply fish head first and in several rows after orientation. Preferably the lower end of this chute is elevated somewhat from the bottom wall 16 of the tub-like device, so that fish previously deposited may pass between the chute and the bottom wall 16. Also it is preferably to arrange the chute to deposit the fish in regions spaced outwardly from the center of rotation and also spaced inwardly in a radial direction from the perimeter region of the bottom wall 16.

In FIG. 8 the feed chute 37 illustrated may be of the shaker type employed in such a manner that the fish are fed without regard to orientation.

In both FIGS. 7 and 8 a spray head 38 is shown for continuously supplying a spray of water to the chutes 36 and 37. One purpose of such a spray is to maintain the inner surfaces of the tub wet at all times. Another purpose is to provide water currents on the upper surface of bottom wall 16 to aid in causing head-first rotary movement of the fish as will be presently explained.

Operation of the equipment described above, and the steps of the method, can be summarized as follows. The tub 11 is driven at a suitable speed selected to give good results for the particular fish F being handled and for the capacity desired. Fish are fed through the top opening and deposited upon the upper surface of the bottom wall 16. If the feed device is as shown in FIG. 7, most of the fish are oriented and are delivered head first upon the bottom wall. If the feed device is as shown in FIG. 8, then the fish are delivered upon the bottom wall without regard to orientation. The fish are rapidly accelerated in a rotary direction by frictional sliding contact with the upper wet surface of the bottom wall. In addition to being accelerated in a rotary direction, the fish tend to slide outwardly by virtue of centrifugal force toward the outwardly angled side walls 17. Because of the physical character of the surfaces of the fish in contact with the bottom wall, having reference particularly to the gills, the fish tend to be oriented head first as they are accelerated. Also water supplied by spray head 38 tends to rotate with the bottom wall and aids head first movement by providing hydraulic force in the natural pockets behind the scales of the fish, thereby driving the fish head first.

Because of the outwardly angled character of the side walls 17, centrifugal force causes fish to slide upwardly from the lower edge of these walls to an arcuate collecting region immediately below the cover means 12 and adjacent the upper edge of the walls 17. In FIG. 3A this arcuate region is indicated at 41, and fish collected in this region press upwardly against the lower side of the cover part 12a as they rotate in contact with the upper margin of the side walls. For the type of cover means shown in FIGS. 1 and 2, the arcuate region 41 extends through an angle greater than 180°, namely about 225°. Fish leaving the collecting region 41 pass through the arcuate track or pathway formed by the part 12b for tangential discharge through the chute 13. While in contact with the side walls the fish rotate at an angular velocity substantially the same as that of the tub.

The chute 13 serves to deliver the fish head first and in single file to a cooperating machine, such as the conveyor of a machine for cutting the fish. The chute may be a simple rectilinear conduit or launder through which the fish are discharged, or it may be provided with impact surfaces to control the speed of the fish. In FIGS. 1 and 2 the chute is shown zigzag to provide impact surfaces 13a, 13b and 13c disposed at an angle to the movement of the fish, whereby fast moving fish tend to strike these surfaces in transit, thus absorbing energy and reducing the discharge velocity. Slower moving fish will not impact these surfaces to the same degree and the slowest fish may pass through the chute with few or no impacts. Thus the discharge velocity is controlled to effect a more uniform discharge speed. Some additional water can also be added to the chute 13 as by means of pipe 42 to ensure that the inner surfaces of the chute are wet at all times and to provide a current of water.

The method and apparatus described above have a number of advantages. Particularly it makes possible the discharge of fish single file at a relatively high rate, thus making it practical to use such a method and apparatus for the feeding of various fish processing machines such as the conveyor of fish cutting equipment. The fish are handled in such a way that they are not mutilated or otherwise physically injured. The equipment is relatively simple and compact for the capacity afforded.

It has been found that the capacity of a given piece of apparatus is greatly increased by preorientation or preheading of the fish whereby most of the fish are oriented head first in several rows before they are delivered upon the bottom of the tub. However, with such preheading, some further heading takes place during passage of the fish through the apparatus.

By way of example, in one particular instance the tub-like device 11 was constructed with a flat horizontal bottom and with side walls 10 inches in vertical height angled outwardly at an angle of 12°. The diameter at the upper edge of the side walls was 36 inches. Both bottom and side walls were made of ordinary galvanized sheet steel. The cover means 12 was made substantially as described in FIGS. 1 and 2. With the tub 11 being driven at a speed of about 120 r.p.m., it was fed with anchovies averaging about 8 inches in length without heading, and at an average rate of about 500 fish per minute. The fish were discharged head first into the chute 13 in single file, with a velocity of about 800 ft. per minute and at a rate corresponding to the rate of feed. The orientation or heading action within the tub 11 was such that about 75% of the fish discharging from the chute 13 were properly headed.

The same equipment was operated as described above, but the fish were preheaded in several rows before delivery into the device 11 to the extent that about 85% of the fish were oriented for delivery head first upon the bottom wall. With such heading it was found that about 99% or more of the fish were delivered head first into the chute 13.

It will be evident that the principles of the invention can be applied to a wide variety of fish. Among the smaller sized fish, reference can be made to various varieties of sardines, pilchards, and anchovies. However, the invention is not confined to handling fish of the smaller sizes, since the principles of the invention can likewise be applied to the handling of larger sized fish such as menhaden, cod, salmon, and the like. For the larger sizes of fish the dimensions of the apparatus may be increased and the drive speed adjusted for optimum results.

In the foregoing, particular reference has been made to the feeding of fish at a high rate to a cutting machine. However, the invention can be used to feed other machines, such as automatic canning, cooking, labelling, boxing and palletizing equipment.

Figure 9:
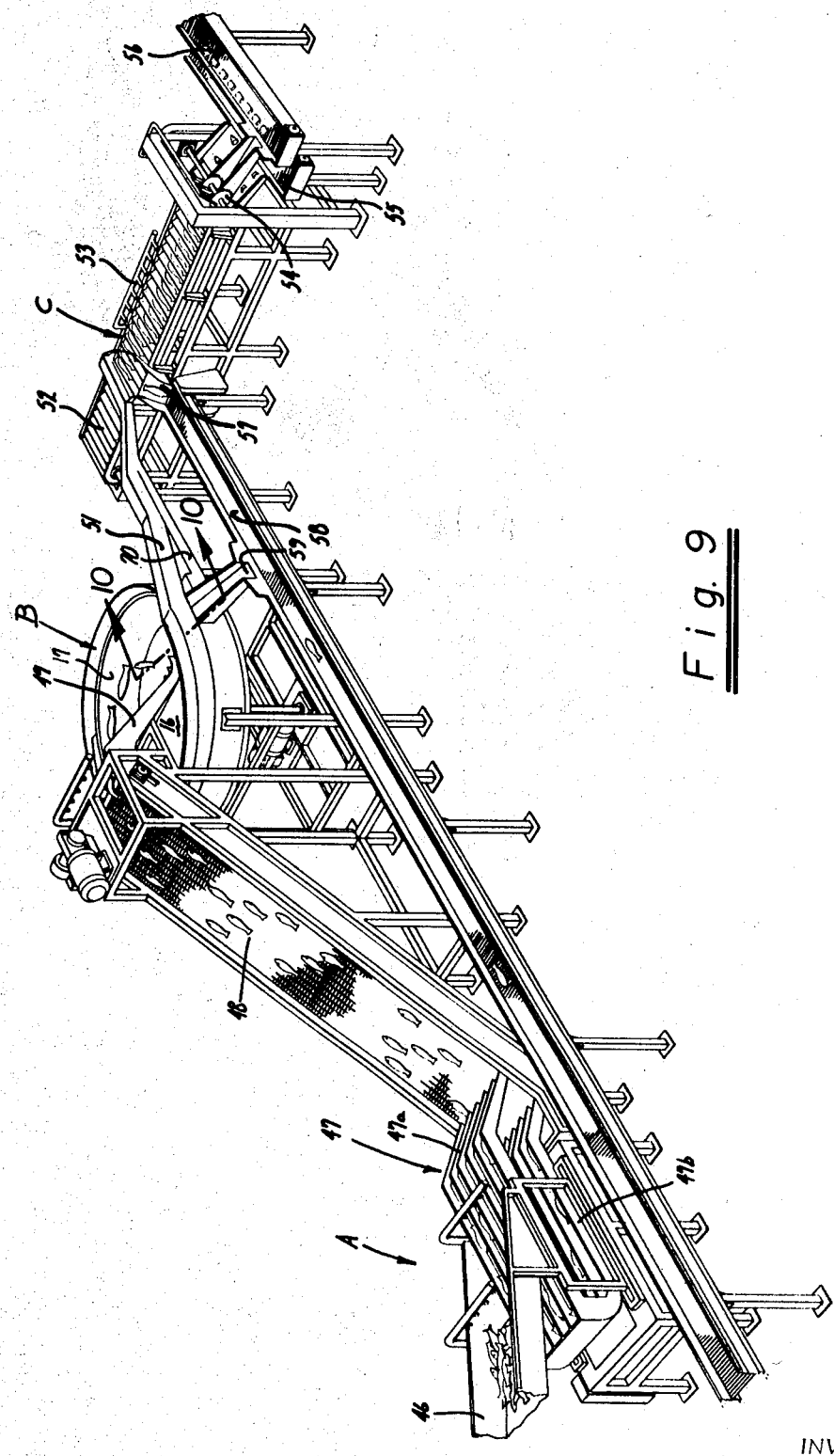
FIG. 9 is a perspective view illustrating equipment incorporating a plurality of operating units for the handling of fish and making use of apparatus similar to that illustrated in FIGS. 1 and 2.

In FIG. 9 the apparatus described above has been incorporated as one unit of a plurality of machines functioning as a system. Thus in this instance a known type of header machine A is supplied with fish by feed chute 46 and is provided with the oscillating shaker unit 47. This unit consists of upper and lower multiple trough sections 47a and 47b, both sections delivering fish head first to the upwardly inclined endless conveyor 48. The troughs of each section 47a and 47b have bottom surfaces formed of sandpaper like material. Fish delivered into a trough of the upper section 47a move to the left or the right depending upon their orientation, with fish moving to the right being delivered directly to the conveyor 48, and fish moving to the left being delivered to the lower section 47b and from thence delivered to the conveyor 48. The upper end of the conveyor 48 delivers the fish through the chute 49 to the apparatus B, which corresponds to the apparatus described in connection with FIGS. 1 and 2. The apparatus B delivers the fish head first and in single file through the chute 51 to the machine C, which in this instance serves to cut off the heads and tails of the fish. The conveyor 52 for the machine C is shown having pockets for receiving individual fish, and water jets 53 are shown for positioning the fish along one side of the conveyor. The rotary cutters 54 are for removing the heads and tails of the fish. The heads and tails are deposited upon the take-away conveyor 55, and the bodies are delivered to conveyor 56. A chute 57 together with a conveyor 58 are shown for removing excess fish that may be delivered by the chute 51. Such fish may be returned to the feed chute 46. Also a chute 59 has been shown in connection with the unit B for the purpose of removing any occasional fish that have a velocity well below that required for proper movement through chute 51. Such fish are likewise returned by conveyor 58.

Figure 10:
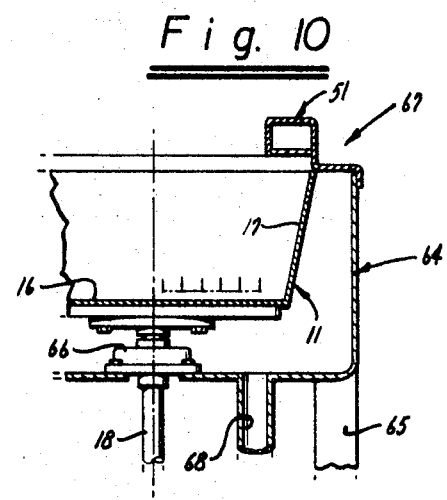
FIG. 10 is a detail in section taken along the line 10—10 of FIG. 9.
Figure 11:
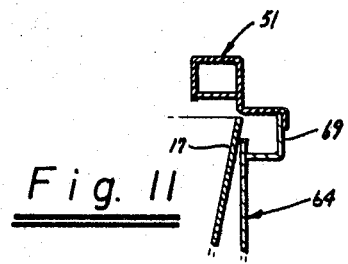
FIG. 11 is a detail in section showing an embodiment including means for collecting discharged water.

The unit B shown in FIG. 9 operates in the same manner as the apparatus illustrated in FIGS. 1 and 2, although the details of construction are different. As illustrated in FIG. 10, the tub 11 is shown positioned within a housing 64 which is supported by the frame members 65. The shaft 18 is journalled by bearing 66. The cover means 67 is indicated as being a single casting or fabricated from sheet metal. Water discharged over the upper edge of the inclined side walls 17 may be drained from the housing 64 through pipe 68. As shown in FIG. 11, the upper part of the housing 64 may be provided with a peripheral launder 69 which collects water discharging from the upper edge of the side walls 17. Water so collected may be discharged into the chute 59, as is indicated by the conduit 70 in FIG. 9.

Figure 12:
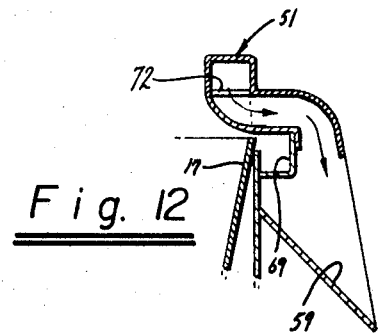
FIG. 12 is a detail in section showing means for removing slow moving fish.

FIG. 12 shows means for removing slow moving fish. The chute 51 near the cover means is provided with a slot 72 in its bottom wall, the slot being slightly larger than the fish. Fish dropped through this slot are diverted into chute 59. When in operation fish having proper velocity move over this slot without interruption. However, an occasional slow moving fish drops through the slot for return.

The equipment illustrated in FIG. 9 operates as follows. The chute 46 supplies the fish to the header unit A which delivers the fish head first and in several rows to the upper run of the conveyor 48. At the upper end of this conveyor the fish are delivered into the individual troughs of the chute 49 and thereby fed head first upon the bottom wall of the rotating tub. The fish are discharged from apparatus B head first and in single file, and are supplied to the conveyor 52 of the cutter machine C. Fish in excess of that required to fill all of the pockets of the feed conveyor 52 are delivered down chute 57 to the conveyor 58. Likewise, any slow moving fish are bypassed to the conveyor 58.

The equipment illustrated in FIG. 9 is not limited by the means employed to feed fish to the cutter machine C. Thus apparatus B permits the fish to be delivered to the cutter C at a rate equal to its maximum cutter capacity.

The equipment of FIG. 13 performs the same general functions as the equipment of FIG. 9. However, in this instance an elevating conveyor 71 removes fish from the feed hopper 72 without regard to orientation. These fish are delivered to the header A1 which performs the same function as the header A of FIG. 9. The fish are thus delivered to the apparatus B1 in the same manner as in FIG. 9, and from thence to the cutter C.

We claim:

1. In a method for handling of fish to deliver them head first to processing operations, wherein a tub-like device having a circular bottom wall and outwardly angled annular side walls is employed, the steps of rotating the device about its central and generally upright axis, delivering fish into the device and upon the circular bottom wall of the same, causing the deposited fish to be accelerated in a direction corresponding generally to the direction of rotation of the device by virtue of sliding frictional contact between the fish and the upper surface of the bottom wall, the fish also being caused by centrifugal force to slide toward the perimeter of the bottom wall, the action of the rotating bottom wall on the fish tending to cause the fish to be spread apart and arranged for movement head first, causing the fish as they reach the perimeter region of the bottom wall to move upwardly over the side walls of the device by centrifugal force to the upper margin of the side walls, collecting the moving fish single file in an arcuate region adjacent and within the upper margin of the side walls, and then causing the fish to move upwardly and away from the upper margin of said side walls for discharge in single file along a discharge path, the fish that are moving at a velocity less than that desired being removed from said path.

2. In a method for the handling of fish to deliver them head first to processing operations, wherein a tub-like device having a circular bottom wall and outwardly angled annular side walls is employed, the steps of rotating the device about its central and generally upright axis, delivering fish into the device and upon the circular bottom surface of the same, causing the deposited fish to be accelerated in a direction corresponding generally to the direction of rotation of the device by virtue of sliding frictional contact between the fish and the upper surface of the bottom wall, the fish also being caused by centrifugal force to slide toward the perimeter of the bottom wall, the action of the rotating bottom wall on the fish tending to cause the fish to be spread apart and arranged for movement head first, causing the fish as they reach the perimeter region of the bottom wall to move upwardly over the side walls of the device by centrifugal force to the upper margin of the side walls, collecting the moving fish single file in an arcuate region adjacent and within the upper margin of the side walls, and then causing the fish to move upwardly and away from the upper margin of said side walls for discharge in single file along a discharge path, the fish that are moving at a velocity greater than that desired being impacted to reduce their velocity, and the fish moving at a velocity less than that desired being removed from said path.

3. In fish handling apparatus, a tub-like device including a circular bottom wall and side walls that are outwardly sloped, means for mounting the device for rotation about a generally vertical axis, feed means for depositing fish into the device and upon the upper surface of the bottom wall whereby the fish have frictional contact with the upper surface of the bottom wall, the fish on said surface being accelerated in the direction of rotation and being moved radially to the perimeter region of the bottom wall by centrifugal force, the fish reaching said perimeter region being also caused to move by centrifugal force upwardly along the side walls of the device to the upper edge of the same, means for collecting fish in single file adjacent the upper margin of the side walls and track means in the form of an arcuate guide having a tangentially directed discharge serving to guide the fish single file upwardly and out of the tub-like device.

4. Apparatus as in claim 3 together with a discharge chute having one end of the same connected with said tangentially directed discharge.

5. Apparatus as in claim 4 together with means incorporated in said chute forming impact surfaces for impacting fish to reduce the velocity of the same.

6. Apparatus as in claim 4 together with means for removing slow moving fish from the chute.

7. Apparatus as in claim 4 together with means for reducing the velocity of fish passing through the chute and means for removing slow moving fish from the chute.

References Cited
UNITED STATES PATENTS

| | | | |
|---|---|---|---|
| 260,104 | 6/1882 | Lidford | 193—32X |
| 1,011,261 | 12/1911 | St. Helens | 193—32X |
| 1,373,812 | 4/1921 | Heath | 17—55 |
| 1,833,637 | 11/1931 | Dennison | 198—33 |
| 1,893,903 | 1/1933 | Mullins | 17—55 |
| 1,967,229 | 7/1934 | Drevitson | 17—55 |
| 2,847,697 | 8/1958 | Bried | 17—11.1 |
| 3,277,996 | 10/1966 | Thurston et al. | 198—220X |
| 3,368,568 | 2/1968 | Love et al. | 198—30X |

FOREIGN PATENTS

| | | | |
|---|---|---|---|
| 1,157,541 | 11/1963 | Germany | 193—27 |

EVON C. BLUNK, Primary Examiner

W. S. CARSON, Assistant Examiner

U.S. Cl. X.R.

17—54, 55; 198—33, 136, 30